Figure 5:
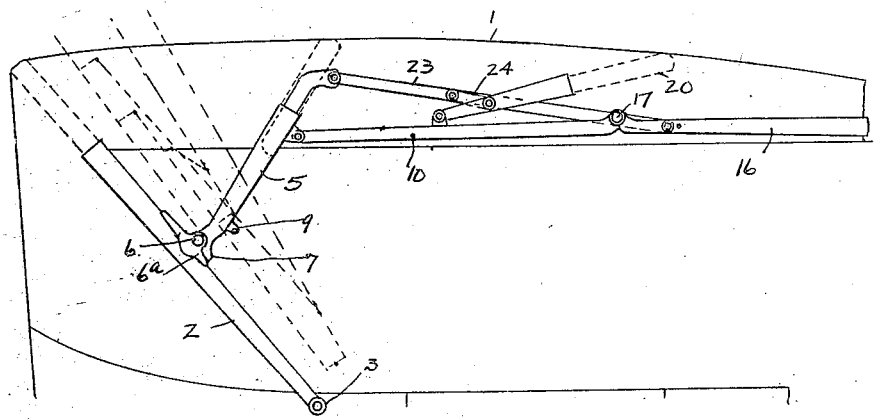

Oct. 14, 1924.
F. K. LEWIS
1,511,570
TOP FOR VEHICLES AND THE LIKE
Filed Jan. 16, 1922  3 Sheets-Sheet 1
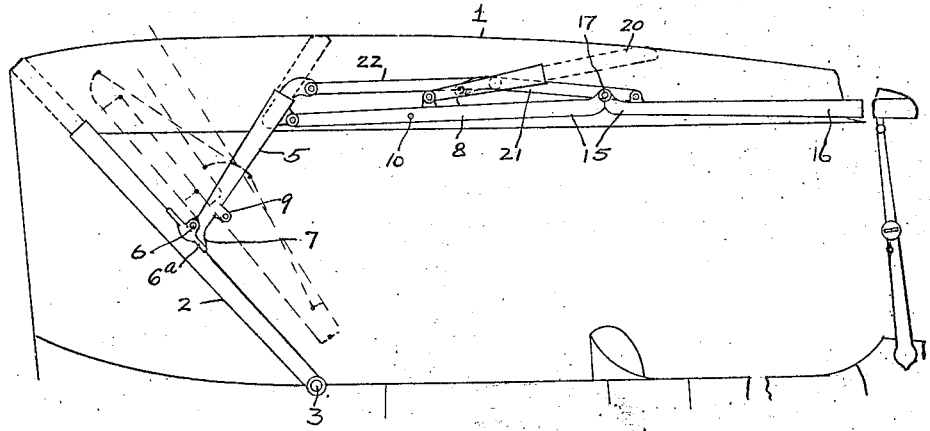
Fig. 1
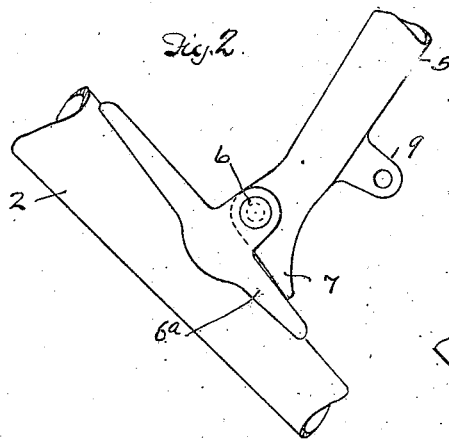
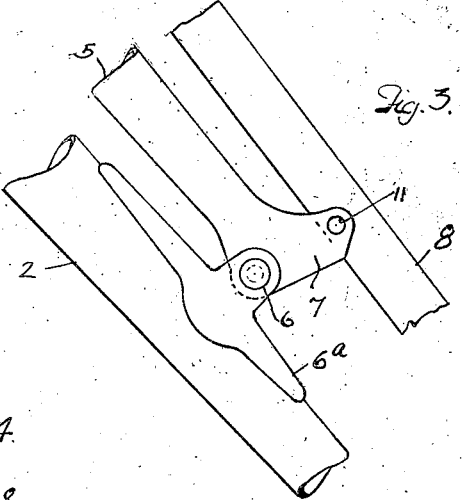
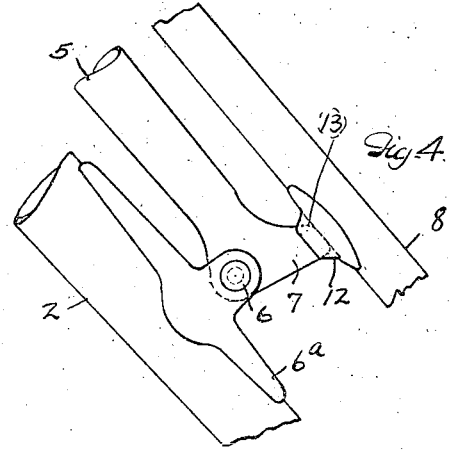
INVENTOR.
Fred K. Lewis.
BY
Fay, Oberlin & Fay
ATTORNEYS INVENTOR.
Fred K. Lewis
BY Fay, Oberlin & Fay
ATTORNEYS

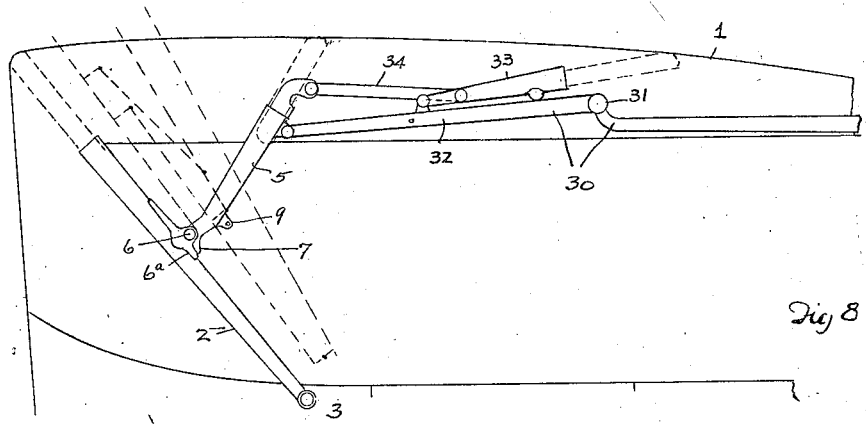
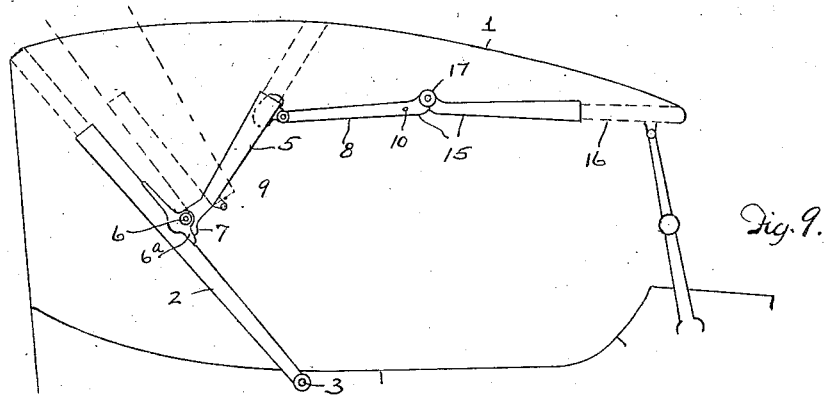
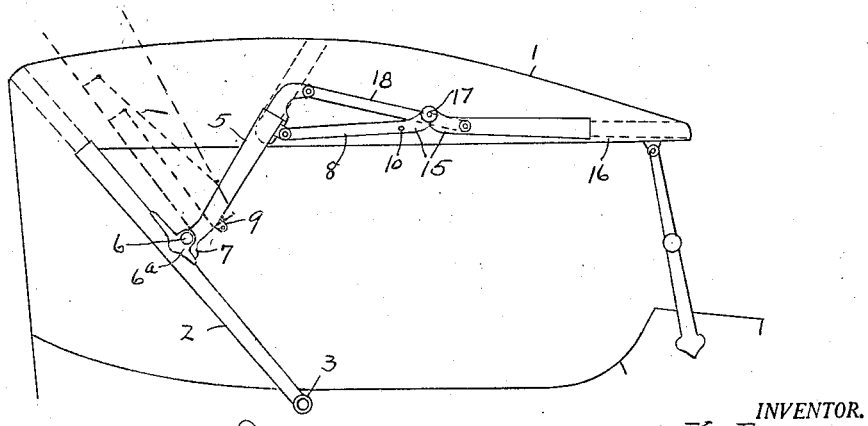

Patented Oct. 14, 1924.

1,511,570

UNITED STATES PATENT OFFICE.

FRED K. LEWIS, OF ASHTABULA, OHIO.

TOP FOR VEHICLES AND THE LIKE.

Application filed January 16, 1922. Serial No. 529,526.

*To all whom it may concern:*

Be it known that I, FRED K. LEWIS, a citizen of the United States, and a resident of Ashtabula, county of Ashtabula, and State of Ohio, have invented a new and useful Improvement in Tops for Vehicles and the like, of which the following is a specification, the principle of the invention being herein explained and the best mode in which I have contemplated applying that principle, so as to distinguish it from other inventions.

In the construction of vehicle tops of the foldable outrigger type known in the trade as "one-man" tops, at present largely in use on automobiles, the outrigger bow is ordinarily supported by a swing arm from the main bow or standard, and in addition some form of linkage is utilized connecting said main bow or standard with either said swing arm or the outrigger bow itself. This involves, particularly in the case of a long top, i. e., one adapted for a vehicle body having two seats, the employment of a more or less complicated system of linkage, as well as the breaking up of the swing arm into two or more component parts, in order that the top may be folded into desired compact form when not in use.

The object of the present invention is to provide, in a top of the general type above referred to, for the support of the outrigger structure proper from a supplemental bow carried by such main bow in such a manner as to require no connection therewith other than at a single pivotal point of support. In this way, not only is the design much simplified in the case of the longer tops, but even in the case of relatively short tops, such as are required for so-called roadster bodies, a corresponding simplification is rendered possible, and at the same time of course the cost of construction is in all cases materially decreased.

To the accomplishment of the foregoing and related ends, said invention, then, consists of the means hereinafter fully described and particularly pointed out in the claims; the annexed drawings and the following description setting forth in detail certain mechanism embodying the invention, such disclosed means constituting, however, but several of the various mechanical forms in which the principle of the invention may be used.

In said annexed drawings:—

Fig. 1 is a side elevation of a top supporting structure or frame embodying my present improvements, the same being shown as adapted for, and mounted on, a two-seated automobile top or tonneau; Fig. 2 is a broken side elevation on a larger scale showing a detail of the construction; Figs. 3 and 4 are views similar to Fig. 2, but respectively showing modifications in the construction of such detail; Figs. 5, 6, 7 and 8 are views similar to Fig. 1, but respectively showing the adaptation of my improved construction to different forms of outrigger structure, all designed for use in so-called four-bow tops adapted for use with relatively long vehicle bodies; and Figs. 9 and 10 are views similar to Fig. 1, respectively showing the adaptation of my improved construction to forms of outrigger structure suitable for use in shorter tops, such as are required for roadster bodies.

While I have thus shown, and shall describe my improved top as applied to an automobile body, it will be understood that it is equally adapted for use on motor boats or other vehicles, and that the number of main bows in addition to the one utilized to support the outrigger structure, as well as the number of supplemental bows carried by the latter, will depend upon the longitudinal extent of the vehicle body which is to be covered by the top. It will also be understood that the term "bow" is used here inclusively to designate, not merely the bow proper, whether of wood or metal, but also the metallic sockets or equivalent members that carry the same, these parts, when regarded in side elevation, constituting the equivalent of the so-called "sticks" in the all-wooden bow type of construction. It will accordingly be a matter of convenience to refer to the parts in the singular, as though the structure lay in a single vertical plane, since the parts of interest do actually lie in substantially such a plane.

In the embodiment of the invention shown in Fig. 1, as well, for that matter, in the modified constructions shown in Figs. 5 to 10, inclusive, the top covering 1 is preferably entirely supported through the outrigger structure from a single main bow or standard 2. The latter, which is of substantial construction, in view of the weight it is thus designed to sustain, is pivotally attached to the body of the vehicle at the point 3 in the usual manner, so that it may be laid down and supported in a substantial horizontal plane when the top is not in use. Normally, in the extended or open condition of the top, said main bow 2 inclines rearwardly at an angle approximately 45 degrees to the horizontal, being held from rising further by the top covering, or by special straps (not shown), or extensions of the longitudinal strainers, which, as is well known, are used to connect the bows together and provide supporting means for the top covering intermediately between said bows. For the purpose in hand such straps or strainers do not require to be distinguished from, but may be regarded as a part of, the covering material.

In each of the several embodiments just referred to, (Figs. 1 and 5 to 10, inclusive), the outrigger structure, it will be observed, is wholly supported from a supplemental bow 5 that is pivotally attached to the main bow or standard 2 at a point approximately midway between its ends, and extends forwardly from said main bow at an angle slightly less than a right angle in the open condition of the top. The parts are so arranged that in such open position of the top the upper end of supplemental bow 5 will lie substantially directly over the point 3 of attachment of the main bow or support 2 to the vehicle body. The outrigger structure, whatever its particular form, is designed to extend in a substantially horizontal line forwardly from said supplemental bow 5, and preferably lies wholly above the lower edge or quarter line of the top covering 1.

In order to support supplemental bow 5 in its forwardly inclined position when the top is open, such bow in this condition sustaining the horizontally extending outrigger structure, said supplemental bow is provided with a stop or lock in conjunction with the pivot 6 whereby it is attached to main bow 2. As illustrated in the several figures of the drawings, this stop takes the form of a downwardly projecting toe 7 that is adapted to contact with the clamp 6ª that provides the aforesaid pivotal connection 6, and so limits supplemental bow 5 to desired angular position relatively to said main bow 2 without, however, interfering with the folding of said supplemental bow against said main bow. The folded position of such supplemental bow, as well as of the various forms of outrigger structure carried thereby, is shown in dotted outline in each of the side elevational views of my improved top, and from these it will be seen that the supplemental bow need extend little, if at all, beyond the main bow when folded thereagainst, while it may be made to contact as closely therewith as desired.

In order to retain the outrigger structure in place when thus folded up, supplemental bow 5 and the main element or swing arm 8 of the outrigger structure are provided with complementary engaging elements whereby such swing arm may be locked to such supplemental bow. As shown in Figs. 1 and 5 to 10, inclusive, and in detail in Fig. 2, such elements consist simply of an apertured lug 9 on the supplemental bow near its lower end and an aperture 10 in the swing arm that is adapted to register with the one in said lug and permit a pin or equivalent fastener to be inserted through both. In place of having a separate apertured lug 9 on the supplemental bow, the locking toe 7 thereof may be formed with an aperture 11, as shown in Fig. 3, disposed thus to register with the aperture 10 in swing arm 8; or, as shown in Fig. 4, instead of utilizing registering apertures and a pin passing therethrough to lock the parts together, one such part, viz, the swing arm, as illustrated, is provided with a recessed boss 12, and the other with a projection 13 adapted to interengage therewith.

The outrigger structure in each of the several forms of top illustrated in the drawings comprises an articulated auxiliary bow, or, as it is sometimes called, outrigger bow 15, the latter term referring more particularly to the outer portion or bow 16 proper, that is secured to supplemental bow 5 by means of the arm 8 previously referred to, one such arm being provided of course on each such side of the top, and so constituting the inner portion of said articulated auxiliary bow 15. The joint 17 between said arm and the outrigger bow proper, except in the construction illustrated in Fig. 8, is a rule joint disposed so as to prevent upward bending of the arm in question when extended in horizontal fashion, as in the open position illustrated in the several figures. It will also be observed that such joint lies above a line connecting the respective ends of auxiliary bow. The outrigger bow 16 supports the extreme forward portion of the top covering in such position, such bow being suitably attached to the front part of the vehicle body through the windshield frame, or other means as found most convenient.

In the case of a short, so-called three-bow type of top, as illustrated in Fig. 9, the outrigger structure may consist simply of the articulated auxiliary bow 15, as just described, without any additionel parts; or, if desired, a link or folding brace 18 may be utilized to support such outrigger structure, such link being pivotally attached at its rear end to supplemental bow 5 at a point above the point of pivotal attachment of swing arm 8 thereto, and at its forward end to said outrigger bow 16 at a point beyond the joint 17.

A somewhat more elaborate system of linkage is desirably employed where the top is longer, e. g., of the four-bow type, as illustrated in Figs. 1 and 5 to 7, inclusive. In each of these constructions, a supplemental bow 20 is mounted on the outrigger structure, being preferably pivotally attached to the swing arm 8 at a point approximately midway between its ends and extending forwardly at an acute angle with respect to said arm in the open position of the top so as to contact with the top covering 1 at a point approximately midway between supplemental bow 5 and outrigger bow 16.

For the purpose of holding such intermediate bow 20 in proper relation to the other bows when the top is thus open, as well as to move same in unison with such other bows when the top is being folded, I may employ, as shown in Fig. 1, a link or brace 21 that is pivotally attached at its rear end to said supplemental bow 20, and at its forward end to outrigger bow 16 at a point a short distance in advance of the joint 17, whereby said outrigger bow is connected with swing arm 8; and a second link or brace 22 is pivotally attached to said first link at a point above the point of pivotal attachment of swing arm 8 thereto. As previously explained, the showing of the parts in dotted outline will make plain the manner in which these links 21 and 22, as well as the other parts of the outrigger structure, co-operate in the folding of the top.

In Fig. 5, I show a system of linkage of the Bonner type for interconnecting supplemental bow 5, outrigger bow 16 and the second supplemental or intermediate bow 20. In other words a single long link 23 extends from said supplemental bow 5 to outrigger bow 16 and a short link 24 connects said long link with the bow 20.

Figure 6:
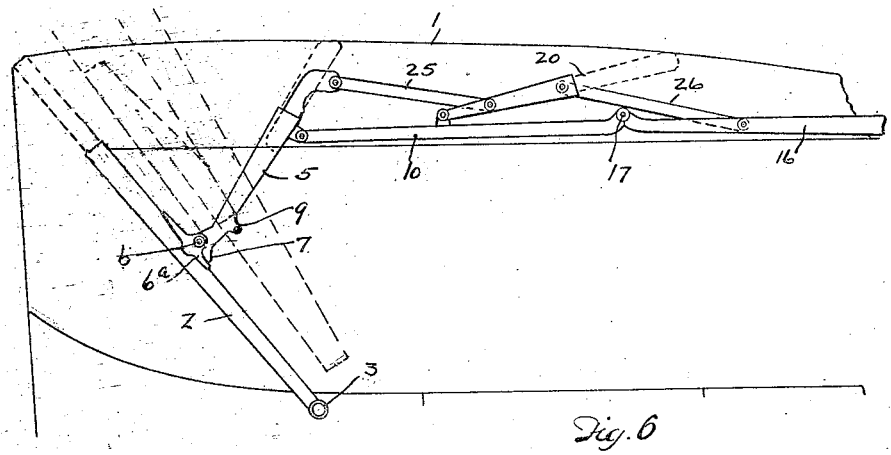

In Fig. 6 two entirely separate links 25 and 26 are shown as employed to thus interconnect the supplemental bow 5 with the bows composing the outrigger structure, said link 25 extending from the supplemental bow to a point on bow 20 near the lower end thereof and said link 26 extending from a point of said bow 20 further removed from its lower end to a point on the outrigger bow spaced a short distance forwardly of the joint 17, just as in the case of the previously described constructions.

Figure 7:
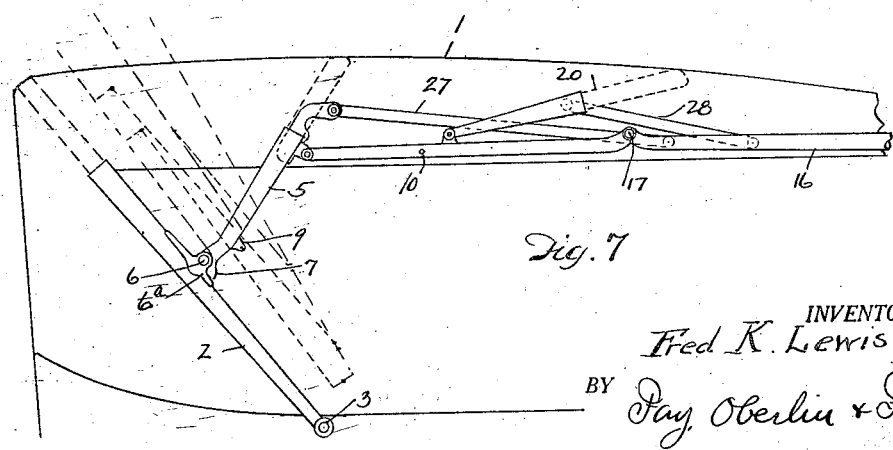

In Fig. 7, I employ a long link 27 similar to link 23 of the construction shown in Fig. 5, in that it extends from the supplemental bow 5 to outrigger bow 16. Instead, however, of connecting said link 27 with bow 20 through the medium of a short link 24, a separate link 28 is utilized, extending from said bow 20 to a point on the outrigger bow forwardly of the point of attachment of link 27 thereto.

The construction shown in Fig. 8, will make plain that the two parts of the articulated auxiliary bow 30 corresponding with previously described auxiliary bow 16, instead of being connected together by a rule joint, may be joined by a freely turning connection 31, the upward bending of such connection beyond desired point being limited by interengagement of the swing arm portion 32 of said auxiliary bow with the supplemental or intermediate bow 33 that corresponds with previously described bow 20. A link 34 connecting the supplemental bow 5 with said bow 33 holds the latter in place against the upward pressure of the swing arm 32 thereagainst in the open position of the top and causes said bow 33 to fold up in unison with the other parts of the outrigger structure when the top is collapsed.

While the manner in which the top is operated requires no further explanation, certain operative results of my improved construction, as exemplified in the several forms thereof hereinbefore described, may properly be pointed out. In the open position of the top a rearward push is applied to the outer portion 16 of the bow 15, incidentally to securing such end to the windshield or equivalent connection with the forward portion of the vehicle body. Due to the construction of joint 17 in said bow 15 whereby upward bending of such joint, when the bow is extended, is prevented, said bow constitutes in effect a rigid member and the stress of such rearward push on the forward end thereof would tend to impart a rearward, i. e. counter-clockwise, rotative movement to said supplemental bow, if said auxiliary bow were freely pivotal relative to the latter. However, the links 21 and 22 in their extended positions are immediately placed under tension, with the two-fold result; first, that said supplemental bow with the outrigger structure is rendered entirely rigid, said links by pulling upwardly on the forward portion 16 of the auxiliary bow serving to insure joint 17 against downward breaking; and, second, said supplemental bow through its pivotal connection with main bow 2 will tend to impart a rearward, i. e. counter-clockwise, rotative movement to said main bow. Such last mentioned rotative movement, however, is prevented by the action of stop 7, as already explained.

The attachment of the forward end of the auxiliary bow to the windshield, accordingly, has the same effect as would follow the tying together of such end and the lower pivoted end of the main bow, viz, the entire frame-structure becomes a self-contained rigid unit, and this quite independently of the use of any strainers, webbing or backstraps whereby the several bows may be connected with each other and the main bow to the rear of the vehicle body. In other words, contrary to the condition in prevailing designs, the top fabric, with or without the incorporation of such reinforcing elements, is required to sustain no strain whatsoever incidentally to maintaining the frame structure in its extended or open-top position.

Moreover, the assembly of my improved top on the vehicle body is for the same reason much facilitated. The main bow of the frame is simply attached to the sides of the body and the forward end of the auxiliary bow to the windshield, whereupon such frame is ready to have the cover elements applied thereto, all the bows being presented in their proper and permanent open-top relationship.

By my improved construction a top is obtained wherein the cover is stretched a predetermined amount only and that just sufficient to maintain it in line, while the strain, due to the pulling and tying down of the forward end of the supporting structure is transmitted wholly through the parts of such structure and not through such cover. Not only is the structure extremely light and simple from the mechanical standpoint but a well formed top and one that will maintain such a form without sagging even under hard conditions of use is rendered possible.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a top for vehicles and the like, the combination of a support pivotally attached to the body of the vehicle and inclining rearwardly from the vertical in the open position of the top; a supplemental bow pivotally attached to said support at a fixed point removed from the lower end thereof, said supplemental bow being adapted to incline forwardly from such support in such open top position and to lie directly alongside of the same when the top is closed; an articulated auxiliary bow pivotally attached at its rear end to said supplemental bow, said auxiliary bow being adapted to extend horizontally from the latter in such open top position and to fold directly thereagainst when the top is closed, and the joint in said auxiliary bow lying above a line connecting its respective ends; means serving to prevent relative rotative movement between said auxiliary and supplemental bows in open top position; a stop at the point of pivotal attachment of said supplemental bow to said support, whereby forward movement of the former relatively to the latter beyond a predetermined inclination is prevented; and means limiting the upward bending of the joint in said auxiliary bow when extended, whereby the stress of any rearward push on the forward end of said auxiliary bow is transmitted in the form of a rearwardly rotative moment onto said support, and undue stretching of the cover between said support and auxiliary bow is avoided.

2. In a top for vehicles and the like, the combination of a support pivotally attached to the body of the vehicle and inclining rearwardly from the vertical in the open position of the top, a supplemental bow pivotally attached to said support at a fixed point removed from the lower end thereof, said supplemental bow being adapted to incline forwardly from such support in such open top position and to lie directly alongside of the same when the top is closed; an articulated auxiliary bow pivotally attached at its rear end to said supplemental bow, said auxiliary bow being adapted to extend horizontally from the latter in such open top position and to fold directly thereagainst when the top is closed, and the joint in said auxiliary bow lying above a line connecting its respective ends; foldable link connections between said supplemental bow and the outer portion of said auxiliary bow, said link connections serving when extended to prevent relative rotative movement between said auxiliary and supplemental bows; a stop at the point of pivotal attachment of said supplemental bow to said support, whereby forward movement of the former relatively to the latter beyond a predetermined inclination is prevented; and means limiting the upward bending of the joint in said auxiliary bow when extended, whereby the stress of any forward push on the forward end of said auxiliary bow is transmitted in the form of a rearwardly rotative moment onto said support, and undue stretching of the cover between said support and auxiliary bow is avoided.

3. In a top for vehicles and the like, the combination of a support pivotally attached to the body of the vehicle and inclining rearwardly from the vertical in the open position of the top; a supplemental bow pivotally attached to said support at a fixed point removed from the lower end thereof, said supplemental bow being adapted to incline forwardly from such support in such open top position and to lie directly alongside of the same when the top is closed; an articulated auxiliary bow pivotally attached at its rear end to said supplemental bow, said auxiliary bow being adapted to extend horizontally from the latter in such open top position and to fold directly thereagainst when the top is closed, and the joint in said auxiliary bow lying above a line connecting its respective ends; an intermediate bow pivotally attached to the rear portion of said auxiliary bow; foldable link connections between said supplemental bow, said intermediate bow and the outer portion of said auxiliary bow, said link connections serving when extended to prevent relative rotative movement between said auxiliary and supplemental bows; a stop at the point of pivotal attachment of said supplemental bow to said support, whereby forward movement of the former relatively to the latter beyond a predetermined inclination is prevented; and means limiting the upward bending of the joint in said auxiliary bow when extended, whereby the stress of any forward push on the forward end of said auxiliary bow is transmitted in the form of a rearwardly rotative moment onto said support, and undue stretching of the cover between said support and auxiliary bow is avoided.

4. In a top for vehicles and the like, the combination of a support pivotally attached to the body of the vehicle and inclining rearwardly from the vertical in the open position of the top; a supplemental bow pivotally attached to said support at a fixed point removed from the lower end thereof, said supplemental bow being adapted to incline forwardly from such support in such open top position and to lie directly alongside of the same when the top is closed; an articulated auxiliary bow pivotally attached at its rear end to said supplemental bow, said auxiliary bow being adapted to extend horizontally from the latter in such open top position and to fold directly thereagainst when the top is closed, and the joint in said auxiliary bow lying above a line connecting its respective ends; an intermediate bow pivotally attached to the rear portion of said auxiliary bow; a link connecting said intermediate bow with the outer portion of said auxiliary bow; a second link connecting said supplemental bow with said first link, said links serving when extended to prevent relative rotative movement between said auxiliary and supplemental bows; a stop at the point of pivotal attachment of said supplemental bow to said support, whereby forward movement of the former relatively to the latter beyond a predetermined inclination is prevented; and means limiting the upward bending of the joint in said auxiliary bow when extended, whereby the stress of any forward push on the forward end of said auxiliary bow is transmitted in the form of a rearwardly rotative moment onto said support, and undue stretching of the cover between said support and auxiliary bow is avoided.

Signed by me, this 12th day of January, 1922.

FRED K. LEWIS.